United States Patent [19]

Rough et al.

[11] Patent Number: 4,654,573
[45] Date of Patent: Mar. 31, 1987

[54] POWER TRANSFER DEVICE

[75] Inventors: J. Kirkwood H. Rough, San Jose; Michael Krolak, Los Gatos; Michael R. Biche, Newark, all of Calif.

[73] Assignee: Flexible Manufacturing Systems, Inc., Los Gatos, Calif.

[21] Appl. No.: 735,481

[22] Filed: May 17, 1985

[51] Int. Cl.$^4$ .................... H02J 7/10; H01M 10/46
[52] U.S. Cl. .......................................... 320/2; 320/21; 320/31; 363/18
[58] Field of Search ............................... 320/2-5, 320/20, 21, 39, 40, 31; 363/15, 18

[56] References Cited

U.S. PATENT DOCUMENTS

| | | | |
|---|---|---|---|
| 3,609,502 | 9/1971 | Burkett et al. | 320/21 X |
| 3,938,018 | 2/1976 | Dahl | 320/2 |
| 4,031,449 | 6/1977 | Trombly | 320/2 |
| 4,260,943 | 4/1981 | Zaderej et al. | 320/21 |
| 4,347,472 | 8/1982 | Lemelson | 320/2 |
| 4,496,896 | 1/1985 | Melocik et al. | 320/21 X |

*Primary Examiner*—R. J. Hickey
*Attorney, Agent, or Firm*—Thomas E. Schatzel

[57] ABSTRACT

Apparatus for transferring electrical power between a power supplying apparatus and power consuming apparatus and having a separable high frequency transformer with a primary permanently mounted to the power supply apparatus and a secondary mounted about the power consuming apparatus. A charging control circuit mounted on the consuming apparatus, e.g. a mobile vehicle includes means for detecting current and voltage delivered through the transformer, and also for monitoring storage batteries within the vehicle. The power supply apparatus includes a power supply circuit comprising a ferrite core transformer and capacitor forming a parallel resonant circuit. The primaries of the transformer are alternately driven by a driver about opposing polarities. The drivers are controlled by a voltage-controlled pulse-width modulator which provides a square wave input to the drivers to cause them to alternatively energize the ferrite core transformer. Power is transferred across the inductor to the resonant circuit as portions of a sine wave. The power supply circuit also includes an internal current sensing circuit to shut current build-up down when current in the resonant circuit becomes too high, and an external control loop which senses power demands of the charging control circuit delivered via an optical communications link within the separable transformer.

7 Claims, 8 Drawing Figures

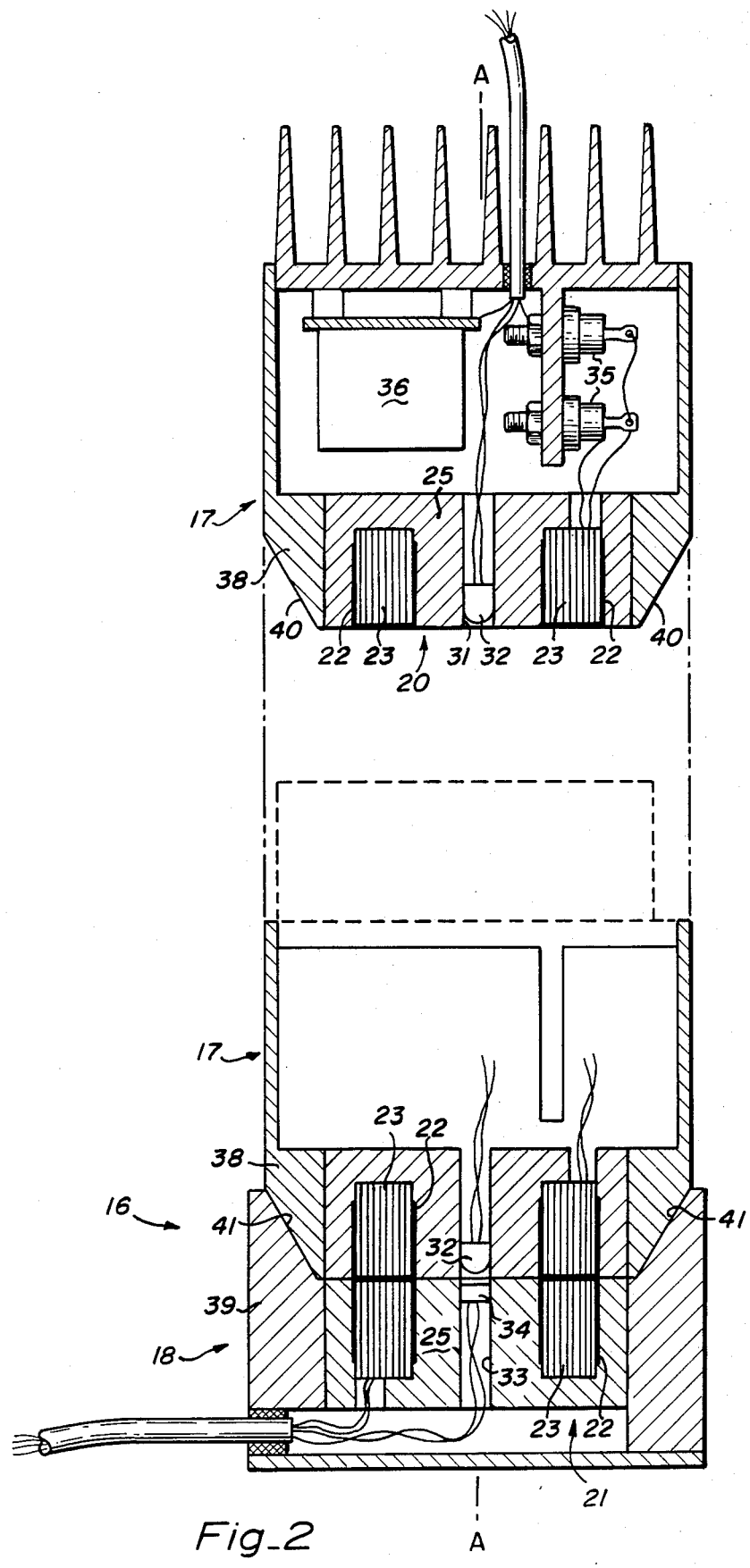
Fig_2

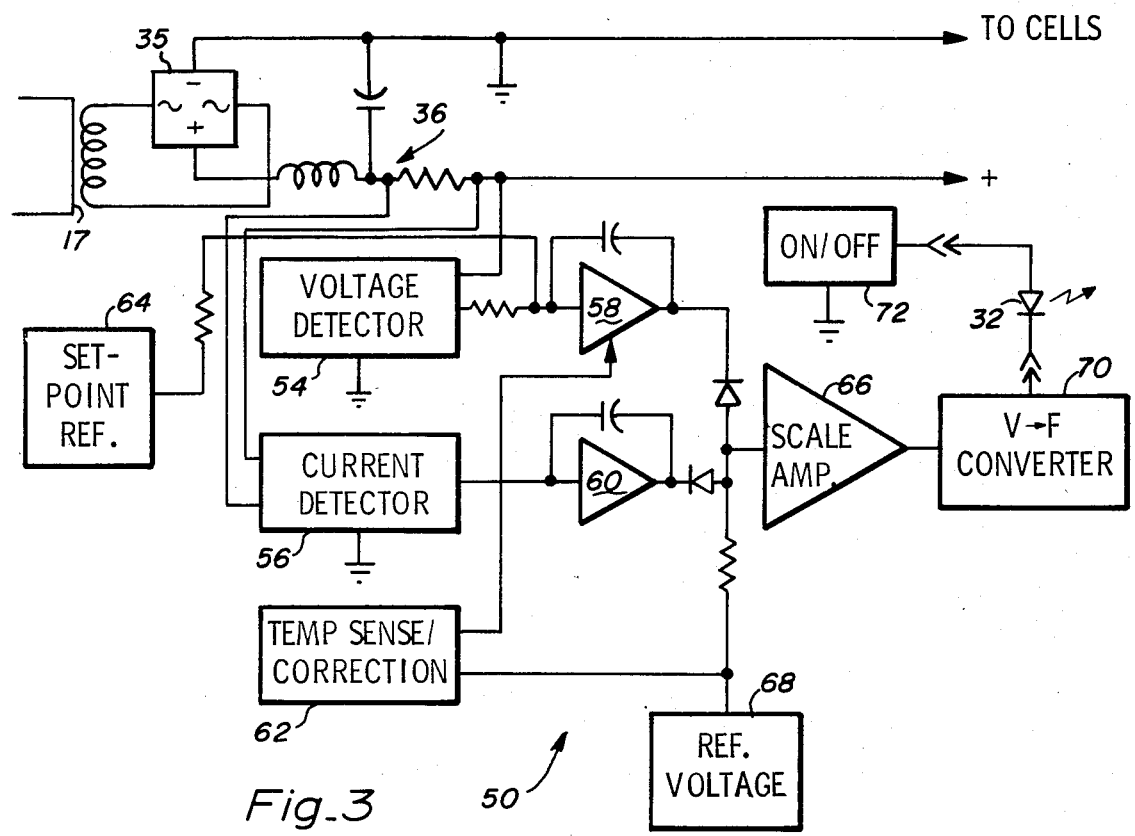
Fig._3
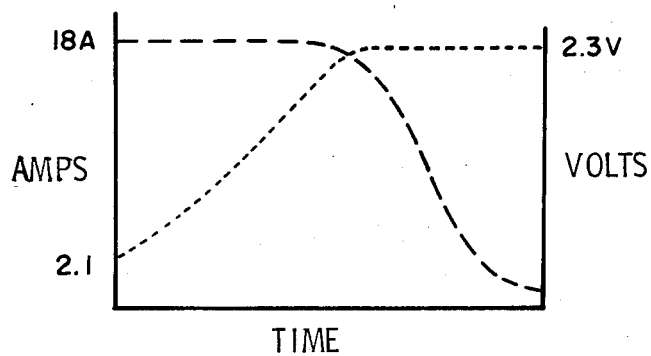
Fig._5A
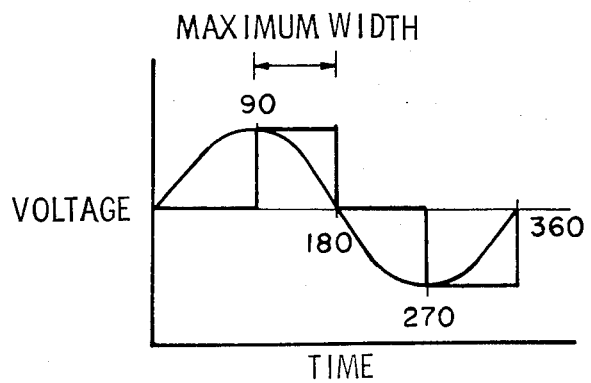
Fig._5B

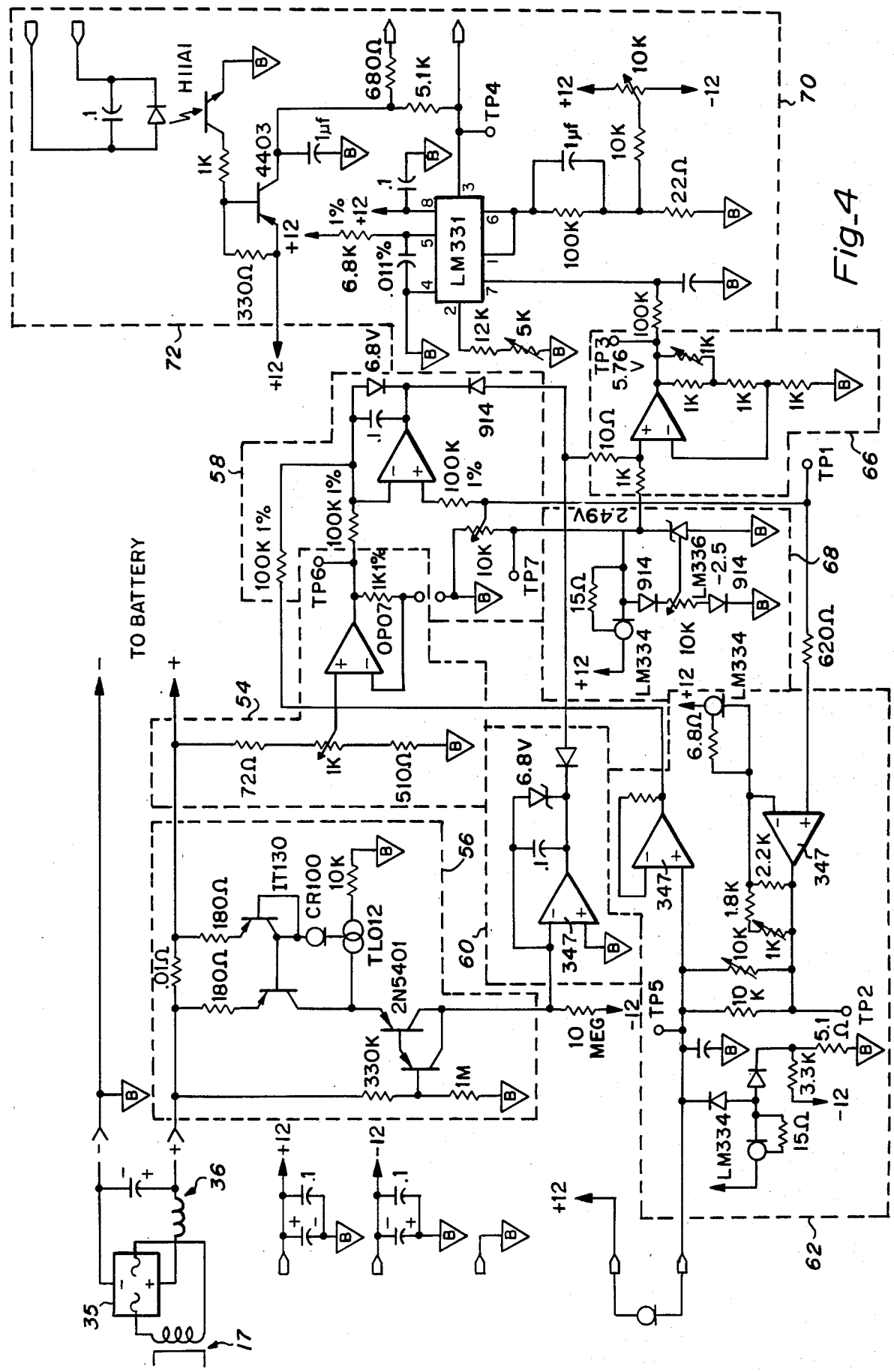
Fig_4

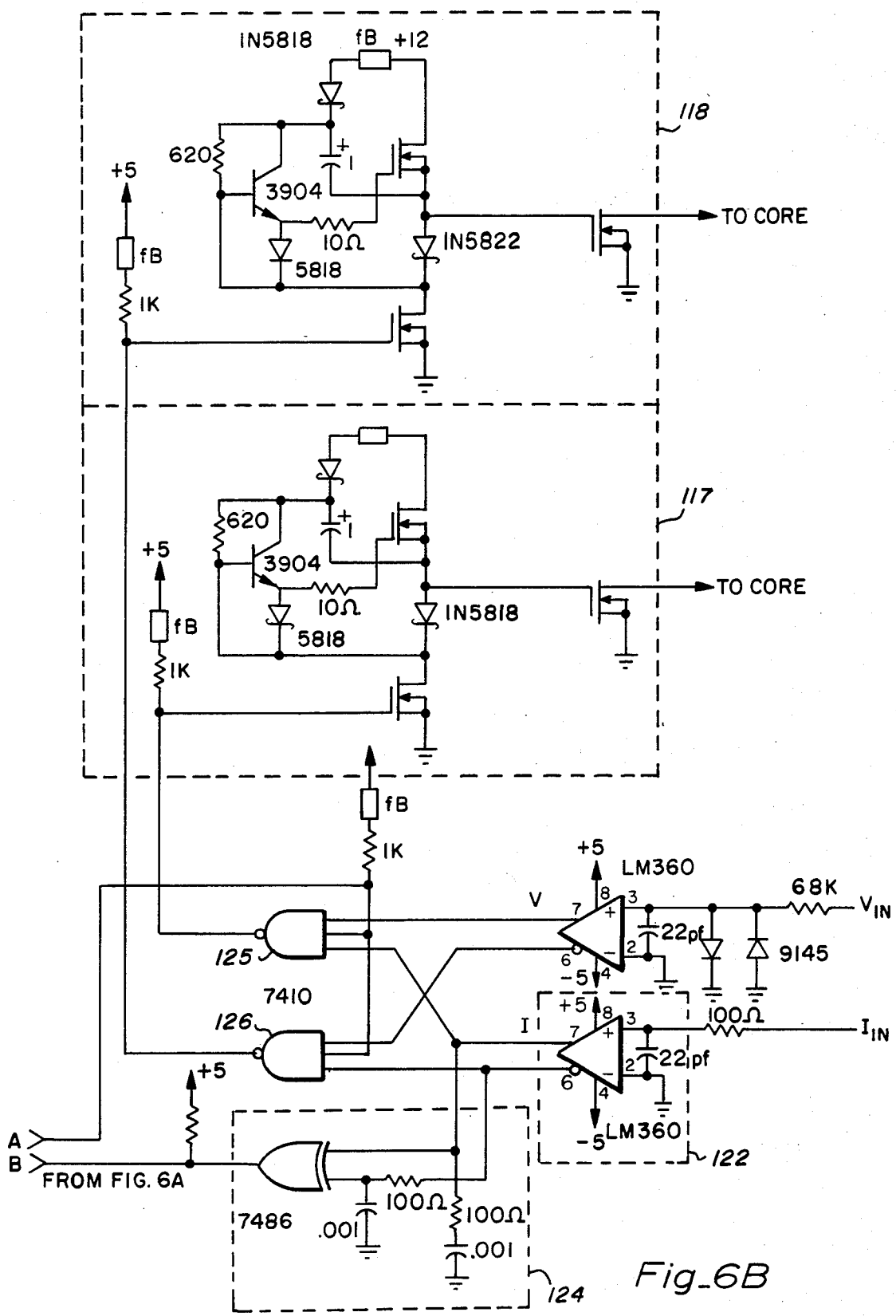
Fig_6B

POWER TRANSFER DEVICE

BACKGROUND OF INVENTION

1. Field of the Invention

This invention relates to an apparatus for transferring electrical power, and more specifically to a magnetic power connector for transferring power without electrically conductive contact.

2. Description of Prior Art

A number of means are known in the art for transferring electrical power from a power source, such as a piece of power equipment, to another piece of equipment requiring power. Typically power transfer occurs between fixed sources or power supplies which allow for the use of conductive elements e.g. cables which are mechanically attached thereto. The cables may be permanently attached between the power source and the energy consuming equipment, or may be removably attached through the use of couplers. Though such cables are efficient in power transfer, they are wholly ineffective in situations where power must be transferred between a fixed piece of equipment and a mobile piece of equipment. Additionally, such connectors often contain unshielded electrically conductive elements subjecting a user to shock hazards, and require considerable insertion force. Such connectors are not useable in situations where thousands of duty cycles will occur, nor are they useable in situations where connections are to be made by machine means such as robotic manipulators.

Other means of transferring power to and between mobile machines generally comprise converting the power into a form of radiation e.g. light or microwave, and directing it to a receiver on the mobile piece of equipment. Such power transfer is highly inefficient, and potentially hazardous to persons or objects exposed to the power beams.

Other devices are known in the art which can induce currents between non-contiguous halves of the device. One familiar example of such a device is a control means for an implanted pacemaker wherein the control means may be placed against the skin above an implanted pacemaker and can induce a current in the pacemaker to alter a rate of the pacemaker. Such devices are limited, however, to generating switching currents, and do not transfer power.

SUMMARY OF THE PRESENT INVENTION

An object of the present invention is to provide a device which can transfer power between a fixed piece of equipment and a mobile piece of equipment.

Another object of the present invention is to provide a power transfer which does not require an electrically conductive contact.

Another object of the present invention is to provide a power transfer which contains no exposed, current-carrying conductors.

Another object of the present invention is to provide a power transfer which requires no frictional contact, and which may be used over an indefinite number of insertion cycles without wear.

Another object of the present invention is to provide a device with zero insertion force, and which may be operated by a robotic manipulator.

Another object of the present invention is to provide a power transfer device which results in highly efficient power transfer.

Briefly, a preferred embodiment of the present invention includes a separable transformer comprising two pot core halves, each positioned in a housing with the housings being able to mate with one another. One pot core half is mounted upon a mobile piece of equipment, for example a mobile transport unit. The other pot core half is mounted about an accessible surface of a fixed piece of equipment which the mobile unit will service and which carries a power source. While the mobile unit is servicing the piece of equipment, for example transferring to it or withdrawing from it cassettes filled with silicon wafers, the power source will supply the mobile unit with power to operate, and with excess power to recharge a plurality of storage batteries carried by the mobile unit. The first pot core half is connected to a charging control circuit on the mobile unit which includes voltage and current detectors, and a battery temperature sense correction means for selecting and controlling the amount of power transferred to the vehicle and to the vehicle storage batteries through the charging device. An output of the charging control circuit is delivered to a voltage-to-frequency converter, which drives a light emitting diode (LED) mounted on the first pot core half. The other pot core half includes a photodiode mounted to optically mate with the light emitting diode of the first pot core half, and is coupled to a frequency-to-voltage converter which receives demand signals from the charging control circuit and regulates an output of a power supply circuit accordingly. The power supply circuit is associated with the other pot-core half, and includes an internal control means including current and voltage sensors which limit the sustaining circulating power to approximately twice the maximum power drawn i.e. circulating power is limited to approximately two kilowatts (KW), and which will shut the system down under a short or open circuit condition. The power control circuit transfers power through the separable transformer as a 25 Khz sine wave for high efficiency and low loss. The power supply circuit utilizes a resonant tank circuit to store power at its periodic frequency to maintain a sinusoidal power source. The tank circuit includes a ferrite-core transformer with a split primary winding. Each primary is in resonance with an energy storage capacitor during 90° of a period of oscillation, and each primary is alternately switched to transfer power to the tank. Power is switched into the resonant tank circuit at the peak of a sine wave voltage, and power transfer is stopped when the wave crosses zero. Each pot core half include a tapered housing to facilitate machine manipulation and insertion.

An advantage of the present invention is that power may be transferred to a mobile piece of equipment during temporary stoppages thereof.

Another advantage of the present invention is that the power transfer is efficient, with minimal electromagnetic noise and power dissipation.

Another advantage of the present invention is that there are no exposed conductors to create safety hazards or arcing on the power transfer device.

Another advantage of the present invention is that there is no frictional contact between halves of the power transfer device, thus eliminating wear.

Another advantage of the present invention is that no insertion force is required, thus allowing for machine manipuation of the device.

These and other objects and advantages of the present invention will no doubt become obvious to those of ordinary skill in the art after having read the following detailed description of the preferred embodiments as illustrated in the various drawing figures.

IN THE DRAWINGS

FIG. 2 is a side cutaway view showing the physical implementation of the two transformer halves of the present invention;

FIG. 3 is a detailed block diagram of the charging control circuitry of FIG. 1;

FIG. 4 is a detailed schematic circuit diagram of the circuitry of FIG. 3;

FIG. 5a is a graph showing a preferred rate of charge as regulated by the circuit of FIG. 3;

FIG. 5b is a graph showing power transfer by a square wave with respect to a sine wave.

DETAILED DESCRIPTION OF THE PREFERRED EMBODIMENT

Figure 1:
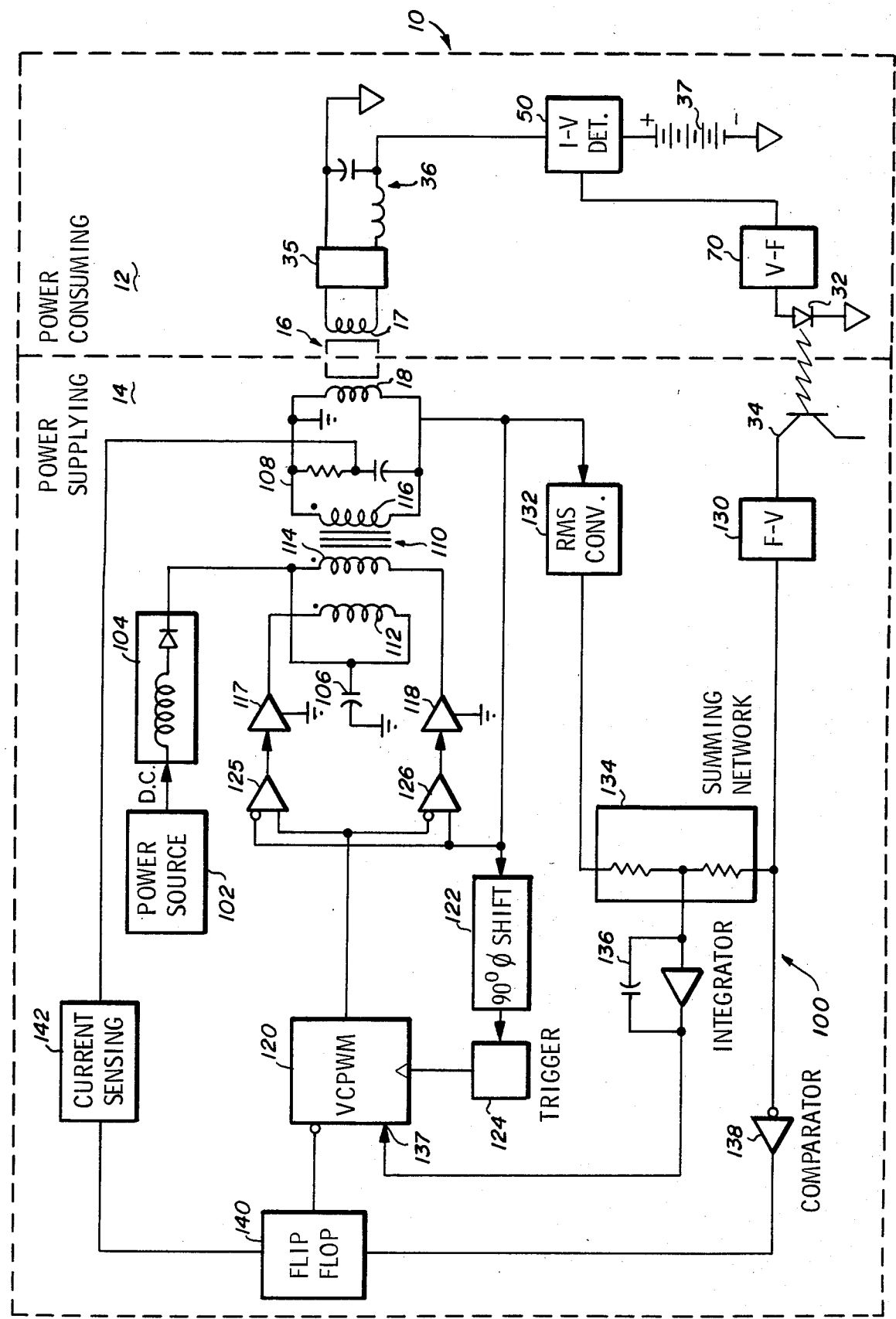
FIG. 1 is a schematic block diagram of the circuitry of the present invention.

FIG. 1 illustrates a schematic block diagram of the present invention and referred to by the general reference character 10. The broken divisional line within FIG. 1 divides those components which may be mounted about a power consuming apparatus 12, for example a mobile vehicle, from those components intended for mounting about a power supplying apparatus 14, for example, a fixed piece of power source equipment. An example of a power consuming apparatus 12 contemplated for use with the present invention is a mobile transport unit substantially as described in co-pending application Ser. No. 692,110 entitled "Infrared Communications System" and assigned to the same assignee as the present invention. To the left of the divisional line are those portions of the apparatus 10 which are intended for mounting about the power supplying apparatus 14. For example, such equipment 14 may be a wafer fabrication machine to and from which a mobile transfer unit will shuttle. Such equipment is also substantially described in the above co-pending application. The apparatus 10 includes a separable transformer 16, illustrated also in the side sectional view of FIG. 2. The separable transformer 16 includes a half 17 intended for mounting on the power consuming apparatus 12, and a half 18 intended for mounting about the power supplying equipment 14. The half 17 includes a pot core assembly 20 and the half 18 includes a pot core assembly 21, which include an insulating "potting" material 22 such as a plastic or a rubber, for example, silicone rubber. Both pot core assemblies 20 and 21 consist of a plurality of electrically insulated circular windings of a flat conductive element 23, each of which are potted with the insulating material 22 in a ferrite core 25. The insulating material 22 covers the sides of the windings 23 and an outside surface thereof to about fifty thousandths of an inch, enough to provide adequate insulation. A slight gap, on the order of two thousandths of an inch, also exists between the ferrite core 25 of the pot core assemblies 20 and 21, when the halves 17 and 18 are mated. This gap protects the mating surfaces of the ferrite cores 25. The pot core assembly 20 includes a central channel 31 formed about a central axis of rotation A thereof and within which is mounted a light emitting diode (LED) 32. The pot core assembly 21 includes a central channel 33 which is coaxial with the channel 31 and which has mounted within it a photodiode 34 for sensing an output of the LED 32. The conductive element 23 of the pot core assembly 20 is connected to a full bridge rectifier circuit means 35 which is in turn coupled to a filter 36, comprising an inductor and capacitor. The rectifier circuit 35 converts the current which is passed through the transformer 16 as alternating current to direct current (DC), and the filter 36 removes the ripple from the rectified DC voltage. The rectified filtered DC is used by a plurality of vehicle storage cells 37, illustrated in schematic in FIG. 1.

The pot core assemblies 20 and 21 are secured within a housing 38 and a housing 39, respectively and fabricated from an aluminum. A tapered surface 40 on the housing 38 mates with a congruently tapered surface 41 on the housing 39.

While FIG. 2 illustrates the presently preferred configuration of the transformer 16, other configurations providing for a coupled magnetic field may be suitable as well. For example the transformer 16 may comprise a ferrite sleeve primary and a cylindrical secondary inserted therein.

A charging control circuit 50 is interposed between the output of the filter 36 and the storage cells 37 and regulates the amount of charge thereto. The charging control circuit 50 is illustrated in a schematic block diagram in FIG. 3, and each schematic block of FIG. 3 is further illustrated in a detailed schematic circuit diagram in FIG. 4. FIG. 4 illustrates the implementation of the blocks of FIG. 3 in the apparatus 10, however, other implementations of the individual blocks are known in the art and may be equally suitable for the individual circuits. The charging control circuit 50 includes a voltage detector 54 for measuring a voltage delivered through the separable transformer 16. A current detector 56 acts to detect the flow of current from the transformer 16. Outputs of the voltage detector 54 and the current detector 56 are fed into a voltage integrator 58 and a current integrator 60, respectively. The integrators 58 and 60 determine the amount of voltage and current flowing from the transformer 16. A temperature sensing/correction circuit 62 includes a transducer means for sensing a temperature of the storage cells 37 and provides an input to the voltage integrator 58 to correct a charging voltage based on battery temperature. A nominal charge rate of the charging control circuit 50 is a constant eighteen amp charge rate to a cell voltage of two and three tenths volts per cell at 20° C. The temperature sensing/correction circuit 62 corrects the nominal cell voltage by minus four millivolts per degree centigrade above 20° C. and by plus four millivolts per degree centigrade below 20° C. After the cells 37 reach the proper voltage levels as determined by the circuit 62, the current drops while the voltage level is held constant at two and three tenths volts. This is illustrated graphically in FIG. 5a.

A set point reference means 64 supplies a signal to the integrator 58 to provide a baseline for a comparison of a voltage inputted into the integrator 58 with a preselected voltage. The output of integrators 58 and 60 is fed to a scale amplifier 66 together with a reference signal from a reference voltage circuit 68. The scale amplifier 66 takes a reference input signal from the integrators 58 and 60 and adds to it a constant, preselected voltage e.g. in the apparatus 10, approximately fifty volts. The scale amplifier 66 supplies this scaled voltage input to a voltage-to-frequency convertor 70, illustrated also in FIG. 1. The voltage-to-frequency convertor 70 takes the voltage output of the scale amp 66 and provides a modulated frequency signal to the LED 32 so that the LED 32 can optically transmit the output of the scale amp 66, and thus the power demands as determined by the charging control circuit 50. An on/off control switch 72 is coupled across the LED 32 to enable or disable transmission of power demands by the charger control circuit 50.

Referring again to FIG. 1, the apparatus 10 includes a power supply 100 which may be part of the power supplying apparatus 14, for supplying power to the power consuming apparatus 12.

A power source 102, for example 115 volts AC line source, is fed through a charging rectifier filter 104 to rectify and filter the incoming AC from the power supply 102. The rectifier/filter 104 includes a half-bridge rectifier and provides an output from the power source 102 across an energy storage capacitor 106 which cyclically dumps energy stored therein to a resonant tank circuit 108. Power is transferred to the tank circuit 108 by means of a ferrite core transformer 110 comprising a first primary winding 112 and a second primary winding 114 coupled to the capacitor 106, and a secondary winding 116 coupled to the tank 108. The windings 112, 114 and 116 are of uniform polarity. Electrical energy is alternately transferred from the primary windings 112 and 114 to the secondary winding 116 by a pair of drivers 117 and 118. A coupling ratio between the primary windings 112 and 114, and the secondary winding 116 must be adjusted to attain critical coupling. An output of the driver 117 is coupled to the primary winding 112 and output of the driver 118 is coupled to the primary winding 114 to cause a magnetization therein which is opposite to that of the winding 112. The drivers 117 and 118 are large transistors, and act to cause an alternate discharge of energy from the power source 102 and energy storage capacitor 106 into the primaries 112 and 114, respectively.

Discharge of the energy storage capacitor 106 is mediated by a voltage-controlled pulse width modulator 120 which puts out fixed width square pulses of slightly less than 90° of a voltage sine wave within the tank circuit 108. The pulses are delivered to the resonant tank circuit 108 at peak intervals of the sine wave i.e. at 90° and at 270°. The width of the pulses put out by the voltage controlled pulse-width modulator 120 are modulated from a preselected minimum value to a maximum of approxmiately 90°. Energy transferred into the tank circuit 108 occurs from a point at about 90° on a voltage sine wave to approximately 180°, and again from about 270° to about 360°. This placement of the square pulses from the drivers 117 and 118 defines the resulting voltage sine wave in the tank circuit 108, and is graphically illustrated in FIG. 5b. Connected to the voltage-controlled pulse-width modulator 120 is a 90°, phase shifter 122 via an intermediate trigger circuit 124. The 90° phase shifter 122 receives an input from the tank circuit 108 and shifts the voltage waveform by 90°. Also receiving a voltage input from the circuit 108 are a pair of decoder drivers 125 and 126, which provide an output to the driver 117 and to the driver 118, respectively. The decoder drivers 125 and 126 are interconnected so that only one decoder driver 125 or 126 is enabled by the voltage-controlled pulse-width modulator 120 to provide an ouput to the drivers 117 or 118 at a time. The decoder drivers 125 and 126 produce a signal pulse width output which is proportional to an input signal, above a preselected threshold value. The phase shifter 122 and trigger 124 provide a signal to the voltage-controlled pulse-width modulator 120 which is 90° out of phase with the voltage waveform zero crossing in the tank circuit 108. The square wave output of the voltage controlled pulse width modulator 120 is alternatively switched by the phase shifter 122 by 180° to enable the decoder drivers 125 and 126 and drivers 117 and 118. The result is that energy is discharged from the supply 102 and storage capacitor 106 through the primaries 112 and 114 when the voltage waveform within the tank 108 is at 90° and 270°, and such discharge of energy stops when the waveform crosses zero. Charges are transferred at the rate of one eighth coloumb per pulse, and a total of two KW may be stored in the tank circuit 108, and one KW withdrawn through the transformer 20. The apparatus 10 thus is designed with a Q of two, i.e., an amount of power stored is twice an amount withdrawn, so the system is not critically damped and the voltage sine wave within the tank circuit 108 is maintained.

The power supply circuit 100 includes both internal and external control. With the halves 17 and 18 of the transformer 16 coupled, the charging control circuit 50 supplies a signal to the LED 32 which is picked by the photodiode 34 mounted within the second half 18. An output of the photodiode 34 is converted to voltage in a frequency-to-voltage convertor 130. A local control loop is tied in with the external control of the circuit 50 and includes an RMS convertor 132, which receives a voltage output from the tank circuit 108, and which determines an average value for the periodic current in the tank 108. Outputs of the frequency-to-voltage convertor 130 and the RMS convertor 132 are summed in a summing network 134, which compares an input command voltage, i.e. that demanded by control circuit 50 via the converter 130, to a voltage in the secondary winding 116 of the supply, as sensed by the convertor 132. An integrator 136 receives an output of the summing network 134 to compare an amount of power stored in the tank 108 with an amount demanded by the circuit 50, and determines whether more or less power is needed. An output of the integrator 136 is fed to a control voltage input 137 of the voltage-controlled pulse width modulator 120. When the power level exceeds a predetermined value, for example, sixty volts RMS, the integrator 136 alters the control voltage on the voltage controlled pulse-width modulator 120 to narrow a resulting pulse width until a constant preselected voltage is again circulating in the tank 108. As power is drawn off, the width of the square pulse is increased again up to the maximum of slightly less than 90°, and current is allowed to again build up in the tank circuit 108.

An output of the frequency-to-voltage convertor 130 is also directed to a comparator 138 which compares a voltage output of the frequency-to-voltage convertor 130 to a preselected value, e.g., fifty volts. If the voltage is above this value, the comparator 138 enables the voltage-controlled pulse-width modulator 120. An output of the comparator is proportional to an input voltage from the frequency-to-voltage convertor 130 above the fifty volt threshold. The output of the comparator 138 is fed into a flip-flop 140 together with an output of a current sensing means 142 which detects and measures current into tank 108. The flip-flop 140 is turned on by the comparator 138 when a power demand on the tank 108 is above the predetermined value. The flip-flop 140 provides an input to enable the voltage-controlled pulse width modulator 120 which begins the process of building up current in the tank circuit 108. When the current circulating in the resonant tank circuit 108 rises above a preselected mean value, for example under an open or short circuit condition of the transformer 16, the current sensing circuit 142 signals the flip flop 140 to disable the voltage-controlled pulse width modulator 120, shutting down current build-up in the tank circuit 108.

Figure 6A:
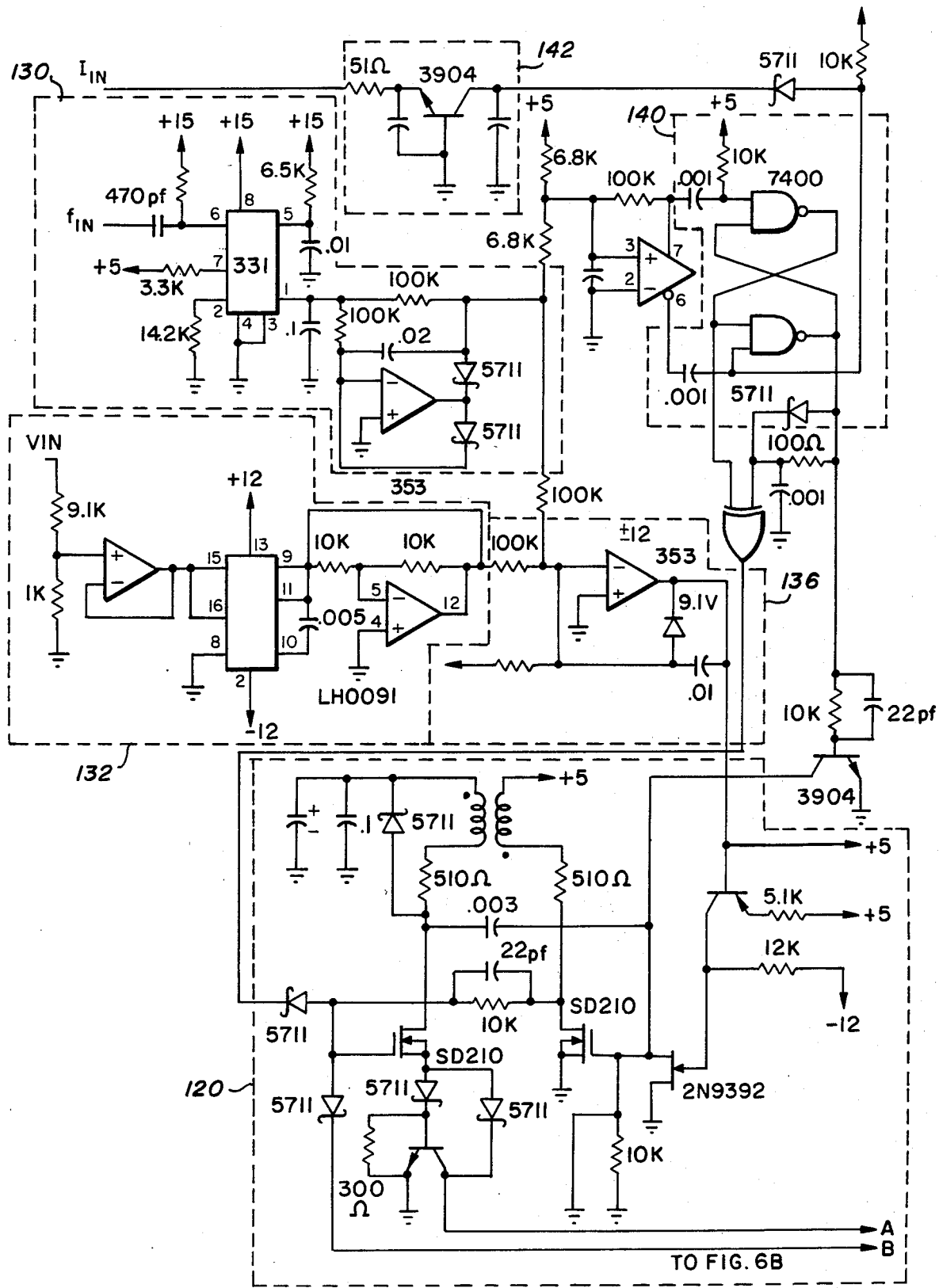
FIG. 6 is a detailed circuit schematic of the power supply circuit of FIG. 1.

FIG. 6 illustrates a detailed circuit schematic of a power supply circuit 100. It may be noted that other configurations of the individual circuits to perform the functions in the power supply circuit 100 of FIG. 1 may be known in the art and may be equally suitable for use with the apparatus 10. Dashed lines enclosing portions of the circuit 100 correspond to blocks within the schematic block diagram of FIG. 1.

Operation of the power transfer apparatus 10 is believed to be as follows. With the transformer 16 decoupled, the photodiode 34 of the power supply circuit 100 detects no demand signal from the charger control circuit 50. Thus the flip-flop 140 is not enabled and no power is drawn from the power supply 102. When a power consuming apparatus desires to recharge, a manipulator (not shown) picks up the transformer half 17 from a storage position on the apparatus 12 and places it onto the transformer 18. The tapered surfaces 40 and 41 act to guide the halves together without the need for precise manipulation by the robotic arm. With the core halves together, a signal is transmitted by the LED 32 to the photodiode 34 which enables the flip-flop 140 via the frequency-to-voltage convertor 130 and comparator 138. Furthermore, the current in the resonant tank 108 will be below the preselected minimum value, and will be sensed by the RMS convertor 132.

An output of the RMS convertor 132 and the frequency-to-voltage 130 will be summed in the summing network 134, and the integrator 136 will determine the amount of power stored in the tank circuit 108. At start-up, the tank 108 and the capacitor 106 will have no power stored therein. An output of the integrator 136 is fed to the control voltage input 137 of the voltage-controlled pulse-width modulator 120, which generates a square-wave pulse of maximum width, i.e., slightly less than or equal to 90°. The integrator 136 continually adjusts the width of the square wave output pulses to provide a power in the tank 108 which is greater than the power drawn off by the transformer 20. These pulses are delivered to the decoder drivers 125 and 126 which in turn act to cause the drivers 117 and 118 to induce current to flow from the power source 102 and energy storage capacitor 106 through the primary windings 112 and 114 of the ferrite core transformer 110. Square waveforms are maintained through the drivers 117 and 118, and a sine wave is transferred across the ferrite core transformer 110 to the resonant tank circuit 108. As current builds up in the tank circuit, the 90° phase shifter 122 and trigger 124 provide an input to the voltage-controlled pulse-width modulator 120 to space the pulses by 90°. Also, the current flowing within the tank circuit 108 further acts upon the decoded drivers 125 and 126 to alternately enable and disable each driver, causing the drivers 117 and 118 to be alternatively driven. Current within the tank circuit 108 is detected by the RMS convertor 132 and as current builds up, a signal from the integrator 138 to the control voltage input 137 of the voltage-controlled pulse-width modulator 120 begins to shorten the pulses put out by the voltage-controlled pulse-width modulator 120 to reduce the amount of energy being delivered to the resonant tank circuit 108. This occurs at approximately sixty volts RMS. Current continues to build up in the tank circuit until approximately two kilowatts of energy are stored, one kilowatt of which may be transferred through the transformer core 20. Should current values within the tank circuit 108 become too high, for example, the transformer 16 is suddenly decoupled or shorted, the current sensing means 142 provides a control input into the flip-flop 140 to disable the voltage-controlled pulse-width modulator 120. Conversely, with the power consuming apparatus 12 drawing power from the transformer core 20, the voltage-controlled pulse-width modulator 120 continues to put out uniform pulses to continue power transfer to the tank circuit 108.

Rough control over the circuit 100 is accomplished by voltage sensing of the RMS convertor 132, and fine control is accomplished by demands from the charging control circuit 50. Charging demands are determined by the charging control circuit 50 and are communicated to the power supply circuit 100 via the LED 30 and photodiode 34. The charging control circuit 50 detects voltage and current flowing through the transformer 16 and also detects a temperature of the storage cells 37. The voltage and current quantities are integrated to compare the amount of power being transferred to the transformer 16 with the amount demanded by the storage cells 37 within the mobile unit 12. The power supply demands as determined by a voltage output of the charger control circuit 50 are converted to frequency in the voltage-to-frequency convertor 70 and transmitted via the optical link to the power supply circuit 100, which supplies power accordingly.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appending claims be interpreted as covering all alterations and modifications as fall within the true spirit and scope of the invention.

We claim:

1. Apparatus for a transfer of power between a power supplying apparatus and power consuming apparatus comprising:

a separable transformer means including a first transformer half and a second transformer half adapted for magnetic coupling, each of said halves having a core of ferrite material for operating at a frequency of at least approximately twenty-five kilohertz;

a charging control circuit connected to the first transformer half and to a plurality of storage batteries for determining an amount of current flowing through the transformer and comparing said amount of current with an amount of charge needed by said plurality of storage batteries to establish a power demand signal;

a first optical communications means connected to the charging control circuit for transmitting said power demand signal;

a power supply circuit having drive power transistors connected to said second transformer half and including transfer means to transfer energy at a frequency of at least approximately twenty-five kilohertz through said transformer; and a second communications means connected to said power supply circuit for receiving a demand signal responsive to said power demand signal from said first communication means to vary an on/off cycle of said drive power transistors whereby an amount of power delivered through said transformer may be regulated thereby.

2. Apparatus for transfer of power between a power supply apparatus and a power consumming apparatus comprising:

a separable transformer comprising a first and a second pot core half, each of said pot core halves including a plurality of windings surrounded by an insulating material;

a charging control circuit, connected to the first pot core half and to at least one storage cell and including at least a first sensing means for sensing a flow of current through the transformer and generating a control signal;

a power supply circuit connected to said second half core including at least a first regulating means for regulating a flow of current through the transformer to said cell, the power supply circuit including a resonant tank circuit means for inductively transferring power at a sine wave, said power being transferred at a first frequency; and an optical transmission link for coupling the control signal with said first regulating means of the power supply circuit.

3. The apparatus of claim 2 wherein said first-frequency of power transfer is approximately 25 KHz.

4. The apparatus of claim 2 wherein,
the charging control circuit includes:
a voltage detector means for detecting a voltage across said transformer and said cell;
a voltage integrator means associated with the voltage detector means for determining the magnitude of a voltage across the transformer;
a current detector means for detecting a current through said transformer and said cell;
a current regulator means associated with the current detector means for determining an amount of current flowing through the transformer;
a temperature sensing and correction means for sensing a temperature of said storage cell and for providing an input to the voltage integrator to correct a voltage value stored thereby;
a reference voltage means connected to an output of the voltage and the current integrators for supplying a reference voltage thereto; and
a scale amplifier means having an input connected to an output of the voltage and current integrator means for amplifying said outputs.

5. The apparatus of claim 2 wherein
the optical transmission link includes:
a voltage-to-frequency convertor having an input connected to an output of the charging control circuit and having an output coupled to a LED;
an on/off control means connected to said LED for enabling a light output therefrom, and a frequency-to-voltage convertor having a frequency input connected to a photodiode, said photodiode positioned to detect a light output of said LED and having a voltage output proportional to a frequency detected by said photodiode, said frequency to voltage convertor being connected to said power supply circuit control means whereby a power demand of the charging control circuit may be communicated to the power supply circuit.

6. The apparatus of claim 2 wherein the power supply circuit includes:

a power source means for delivering a source of low impedance direct current, the means including a charging inductor and rectifier means and an energy storage capacitor means;

a resonant inductor circuit means coupled to the power source means and comprising a first and second primary winding, and a secondary winding, said first primary winding being in resonance with the power source means during 90° of a period of oscillation thereof, and said second primary winding being in resonance with said power source means during a second 90° period of oscillation which is 180° out of phase with said first 90° period, said secondary being connected to a capacitor forming a tank circuit for storing a discharge of energy from said first and said second primary windings, the tank circuit being connected to the second half core;

a first driver for driving the first primary winding, and a second driver for driving the second primary winding, each driver being alternatively driven by a first and a second decoder driver;

a voltage-controlled pulse-width modulator for producing a square pulse waveform to said decoder drivers;

a flip flop means connected to a start input of the voltage-controlled pulse-width modulator for initiating said pulse generation;

a phase shift and trigger means connected to a control input of the voltage-controlled pulse-width modulator and receiving an input from said resonant tank circuit whereby said voltage-controlled pulse-width modulator is controlled to put out square voltage pulses which are 90° out of phase with a voltage sine wave circulating in said tank circuit, said pulses produced by said voltage-controlled pulse-width modulator being 90°; and a control means connected to said tank circuit and to said control input of the voltage-controlled pulse-width modulator for sensing and controlling a power output of the circuit.

7. The apparatus of claim 6 wherein
the control means includes:
an RMS convertor, connected to an output of said tank circuit;
a summing network, connected to the RMS convertor and to said first sensing means; and
an integrator means for receiving an input from the summing network and providing a voltage output to a control voltage input of the voltage-controlled pulse width modulator whereby a voltage circulating in the resonant tank is compared with a voltage demand of said first sensing means and said pulse width of the voltage-controlled pulse-width modulator may be altered thereby.

* * * * *